United States Patent
Futae et al.

(10) Patent No.: US 11,215,222 B2
(45) Date of Patent: Jan. 4, 2022

(54) TURBOCHARGER

(71) Applicant: MITSUBISHI HEAVY INDUSTRIES, LTD., Tokyo (JP)

(72) Inventors: Takaya Futae, Tokyo (JP); Naoyuki Nagai, Tokyo (JP); Shinji Ogawa, Tokyo (JP); Taiyo Shirakawa, Nagasaki (JP)

(73) Assignee: MITSUBISHI HEAVY INDUSTRIES MARINE MACHINERY & EQUIPMENT CO., LTD., Nagasaki (JP)

( * ) Notice: Subject to any disclaimer, the term of this patent is extended or adjusted under 35 U.S.C. 154(b) by 168 days.

(21) Appl. No.: 16/625,314

(22) PCT Filed: Feb. 4, 2019

(86) PCT No.: PCT/JP2019/003809
§ 371 (c)(1),
(2) Date: Dec. 20, 2019

(87) PCT Pub. No.: WO2019/156014
PCT Pub. Date: Aug. 15, 2019

(65) Prior Publication Data
US 2021/0332846 A1    Oct. 28, 2021

(30) Foreign Application Priority Data
Feb. 8, 2018    (JP) .............. JP2018-021113

(51) Int. Cl.
*F16C 17/02*    (2006.01)
*F16C 27/02*    (2006.01)
*F02B 39/14*    (2006.01)

(52) U.S. Cl.
CPC .............. *F16C 17/02* (2013.01); *F02B 39/14* (2013.01); *F16C 27/02* (2013.01);
(Continued)

(58) Field of Classification Search
CPC .......... F02B 39/14; F16C 17/02; F16C 17/04; F16C 17/10; F16C 27/02; F16C 27/045;
(Continued)

(56) References Cited

U.S. PATENT DOCUMENTS

| 9,534,632 B2 | 1/2017 | Oki et al. |
| 10,738,653 B2 * | 8/2020 | Payyoor ................. F16C 27/045 |

(Continued)

FOREIGN PATENT DOCUMENTS

| CN | 104863701 A | 8/2015 |
| CN | 106460917 A | 2/2017 |

(Continued)

OTHER PUBLICATIONS

International Search Report dated Mar. 12, 2019, issued in counterpart International Application No. PCT/JP2019/003809, with English Translation. (4 pages).

(Continued)

Primary Examiner — Audrey B. Walter
Assistant Examiner — Dapinder Singh
(74) Attorney, Agent, or Firm — Westerman, Hattori, Daniels & Adrian, LLP

(57) ABSTRACT

A turbocharger includes a rotor shaft that is rotationally driven, a compressor impeller attached to the rotor shaft, and a cylindrical bearing portion that includes an inner cylinder and an outer cylinder, and that supports the rotor shaft in a rotatable manner. A first damping portion is provided between an axial first end portion of the inner cylinder and an axial first end portion of the outer cylinder, and an axial second end portion of the inner cylinder is connected with an axial second end portion of the outer cylinder. A second damping portion is provided between a housing and the axial second end portion. The housing and the bearing portion are fixed by a flange portion provided at the first end portion of (Continued)

the outer cylinder in such a manner as to restrict movement of the flange portion in a radial direction and in an axial direction.

3 Claims, 3 Drawing Sheets

(52) U.S. Cl.
CPC ...... *F05D 2220/40* (2013.01); *F05D 2240/54* (2013.01); *F05D 2260/98* (2013.01)

(58) Field of Classification Search
CPC ............... F16C 2360/24; F01D 25/164; F05D 2220/40; F05D 2240/54; F05D 2260/96; F05D 2260/98
See application file for complete search history.

(56) References Cited

U.S. PATENT DOCUMENTS

| | | | |
|---|---|---|---|
| 2011/0223011 A1* | 9/2011 | Boning | F16C 27/066 415/170.1 |
| 2015/0240871 A1 | 8/2015 | Oki et al. | |
| 2017/0044933 A1 | 2/2017 | Uneura et al. | |
| 2017/0292405 A1 | 10/2017 | Isogai | |
| 2017/0298769 A1 | 10/2017 | Isogai | |
| 2017/0314616 A1* | 11/2017 | Noda | F16C 27/045 |
| 2018/0073433 A1 | 3/2018 | Noda et al. | |
| 2018/0231053 A1 | 8/2018 | Uneura et al. | |
| 2018/0363501 A1 | 12/2018 | Noda et al. | |

FOREIGN PATENT DOCUMENTS

| | | |
|---|---|---|
| CN | 106536892 A | 3/2017 |
| CN | 107076017 A | 8/2017 |
| CN | 107269328 A | 10/2017 |
| CN | 107429607 A | 12/2017 |
| EP | 0781908 A2 | 7/1997 |
| EP | 3 369 908 A1 | 9/2018 |
| JP | 1-162046 U | 11/1989 |
| JP | H11-159526 A | 6/1999 |
| JP | 2010-133530 A | 6/2010 |
| JP | 2013-047551 A | 3/2013 |
| JP | 2013-155688 A | 8/2013 |
| JP | 2015-161179 A | 9/2015 |
| WO | 2017/069025 A1 | 4/2017 |
| WO | 2017/094183 A1 | 6/2017 |

OTHER PUBLICATIONS

Office Action dated Jan. 19, 2021, issued in counterpart CN Application No. 201980003180 with English translation. (15 pages).

Extended European Search Report dated Sep. 24, 2021, issued in counterpart EP Application No. 19750395.6. (6 pages).

* cited by examiner

TURBOCHARGER

TECHNICAL FIELD

The present invention relates to a turbocharger.

BACKGROUND ART

There has been a commonly-known turbocharger that introduces fuel gas generated in an internal combustion engine into a turbine to rotationally drive a turbine portion so as to rotate a rotor shaft, and that compresses air, to be sucked into the internal combustion engine, by an impeller attached to the end portion of the rotor shaft. The turbocharger is provided with a bearing that rotatably supports the rotor shaft. As a bearing to be applied to the turbocharger, a semi-floating bearing is available. The semi-floating bearing uses oil to be interposed between a cylindrical bearing and a rotor shaft inserted into the bearing so as to support the rotor shaft in a rotatable manner (for example, PTL 1).

CITATION LIST

Patent Literature

[PTL 1]
Japanese Unexamined Patent Application, Publication No. 2010-133530

SUMMARY OF INVENTION

Technical Problem

The semi-floating bearing described above can be a semi-floating integral journal-thrust bearing that also serves as a thrust bearing by bringing the axial end surface of the bearing into contact with the rotor shaft to restrict movement of the rotor shaft in the axial direction.

This semi-floating integral journal-thrust bearing needs to be positioned. It is conceivable to employ a pinning structure as a positioning structure. More specifically, a round opening is formed at the axially central portion of the bearing, and a pin with its outer diameter slightly smaller than the diameter of the opening is inserted through this opening so as to position the bearing. In this configuration, movement of the bearing in the horizontal direction is restricted by the pin that interferes with the edge of the opening, and thus the bearing can be positioned.

In general, a semi-floating bearing is provided with a back damper between the outer peripheral surface of the bearing and the body portion having the bearing accommodated therein in order to improve vibrational stability. The semi-floating bearing allows the back damper to act on vibrations in the radial direction to damp the vibrations. Therefore, the semi-floating bearing needs to be movable in the radial direction in order to allow the back damper to act on the vibrations.

However, it is necessary for the structure of the semi-floating integral journal-thrust bearing described above to form a gap between the edge of the opening and the outer peripheral surface of the pin in order that the bearing becomes movable in the radial direction so as to allow the back damper to act on vibrations. When the gap is formed between the edge of the opening and the outer peripheral surface of the pin as described above, this gap allows the bearing to move in the axial direction by an amount according to the gap. As the rotor shaft moves, an impeller attached to one end of the rotor shaft also moves in the axial direction. When the impeller moves toward the housing, there is a possibility that the impeller may interfere with other members (for example, the housing accommodating therein the impeller), and thus the impeller may be damaged. When a gap is provided between the impeller and the other members in order to prevent the impeller from interfering with the other members, gas compressed by the impeller may leak from this gap. This may cause performance degradation in the turbocharger.

An object of the present invention, which has been made in view of the above circumstances, is to provide a turbocharger that can prevent an impeller from being damaged, and can minimize performance degradation.

Solution to Problem

In order to solve the above problems, the turbocharger according to the present invention employs the following solutions.

The turbocharger according to one aspect of the present invention is a turbocharger including: a rotor shaft that is rotationally driven by a driving force of a turbine portion supplied with fuel gas discharged from an internal combustion engine; an impeller that is attached to the rotor shaft and compresses gas; a cylindrical bearing portion that includes a cylindrical inner cylinder portion having the rotor shaft located therein, and a cylindrical outer cylinder portion covering the inner cylinder portion from a radially outer side, and that supports the rotor shaft in a rotatable manner; and a housing that accommodates therein the impeller and the bearing portion, wherein a gap is formed between an axial first end portion of the inner cylinder portion and an axial first end portion of the outer cylinder portion, and an axial second end portion of the inner cylinder portion is connected with an axial second end portion of the outer cylinder portion, a first damping member is provided in the gap, a second damping member is provided between the housing and the second end portion of the outer cylinder portion, and the housing and the bearing portion are fixed by a fixing portion provided at the first end portion of the outer cylinder portion in such a manner as to restrict movement of the fixing portion in a radial direction and in an axial direction.

As the rotor shaft moves, the impeller attached to the rotor shaft also moves in the axial direction. When the impeller moves toward the housing, there is a possibility that the impeller may interfere with the housing, and thus the impeller and the housing may be damaged. When a gap is provided between the impeller and the housing in order to prevent the impeller from interfering with the housing, gas compressed by the impeller may leak from this gap. This may cause performance degradation in the turbocharger. In the above configuration, movement of the bearing portion in the axial direction is restricted by fixing the bearing portion to the housing. As described above, because movement of the bearing portion in the axial direction is restricted, this can prevent the rotor shaft from moving in the axial direction due to the movement of the bearing portion in the axial direction. Therefore, the impeller and the housing can be prevented from being damaged by interference of the impeller with the housing. Also, performance degradation in the turbocharger can be minimized.

In some cases, vibrations in the radial direction are input to the rotor shaft due to driving of a turbine portion or other reasons. When vibrations in the radial direction are input to the rotor shaft, then these vibrations are input from the rotor shaft to the bearing portion. In the above configuration, the bearing portion is fixed to the housing by the fixing portion provided at a first end portion of the outer cylinder portion. That is, the bearing portion is fixed to the housing in a cantilevered manner. With this structure, when vibrations in the radial direction are input to the bearing portion, the bearing portion vibrates with the first end portion serving as a fixed end and a second end portion serving as a free end on opposite side of the first end portion. When the second end portion of the bearing portion vibrates as a free end, the second damping member provided between the housing and the second end portion of the outer cylinder portion acts on the vibrations and damps these vibrations. In this manner, the vibrations closer to the second end portion of the bearing portion can be damped.

Meanwhile, a gap is formed between a first end portion of the inner cylinder portion of the bearing portion and the first end portion of the outer cylinder portion, and the inner cylinder portion is connected at a second end portion with the outer cylinder portion. With this structure, when vibrations in the radial direction are input to the bearing portion, the inner cylinder portion vibrates at the first end portion as a free end. When the first end portion of the inner cylinder portion vibrates as a free end, the first damping member provided between the first end portion of the inner cylinder portion and the first end portion of the outer cylinder portion acts on the vibrations and damps these vibrations. In this manner, the vibrations closer to the first end portion of the bearing portion can be damped.

Therefore, in the above configuration, even when vibrations in the radial direction are input to the rotor shaft, the vibrations can still be damped in almost the entire region in the axial direction. The vibrations can thus be properly damped, and accordingly vibrations in the turbocharger in its entirety can be reduced.

In the above configuration, the bearing portion vibrates with its one-side end portion serving as a fixed end, and the other-side end portion serving as a free end. This can increase the amplitude of vibrations at the free end. The vibrations can thus be more properly damped by the damping members.

In the turbocharger according to one aspect of the present invention, the inner cylinder portion and the outer cylinder portion may be formed from separate members.

In the above configuration, the inner cylinder portion and the outer cylinder portion are formed from separate members. In this way, the bearing portion can be formed by molding the cylindrical inner cylinder portion and the cylindrical outer cylinder portion of a relatively simple structure, and then fixing the second end portion of the molded inner cylinder portion to the second end portion of the molded outer cylinder portion. Therefore, the bearing portion can be easily formed.

In the turbocharger according to one aspect of the present invention, the inner cylinder portion and the outer cylinder portion may be formed from a single member.

In the above configuration, the inner cylinder portion and the outer cylinder portion are formed from a single member, and therefore the number of components can be reduced.

Advantageous Effects of Invention

The present invention can prevent an impeller from being damaged, and minimize performance degradation.

DESCRIPTION OF EMBODIMENTS

One embodiment of the turbocharger according to the present invention is described below with reference to the drawings.

The turbocharger according to the present embodiment is a turbocharger 1 to be used in, for example, a diesel engine (internal combustion engine) that is the main engine of a ship, or a diesel engine (internal combustion engine) of a vehicle such as an automobile. The turbocharger 1 compresses air using a driving force obtained by fuel gas from the diesel engine, and supplies the compressed air to a combustion chamber of the diesel engine. The turbocharger 1 according to the present embodiment is a dynamic pressure turbocharger that mainly uses kinetic energy of fuel gas from the diesel engine.

Figure 1:
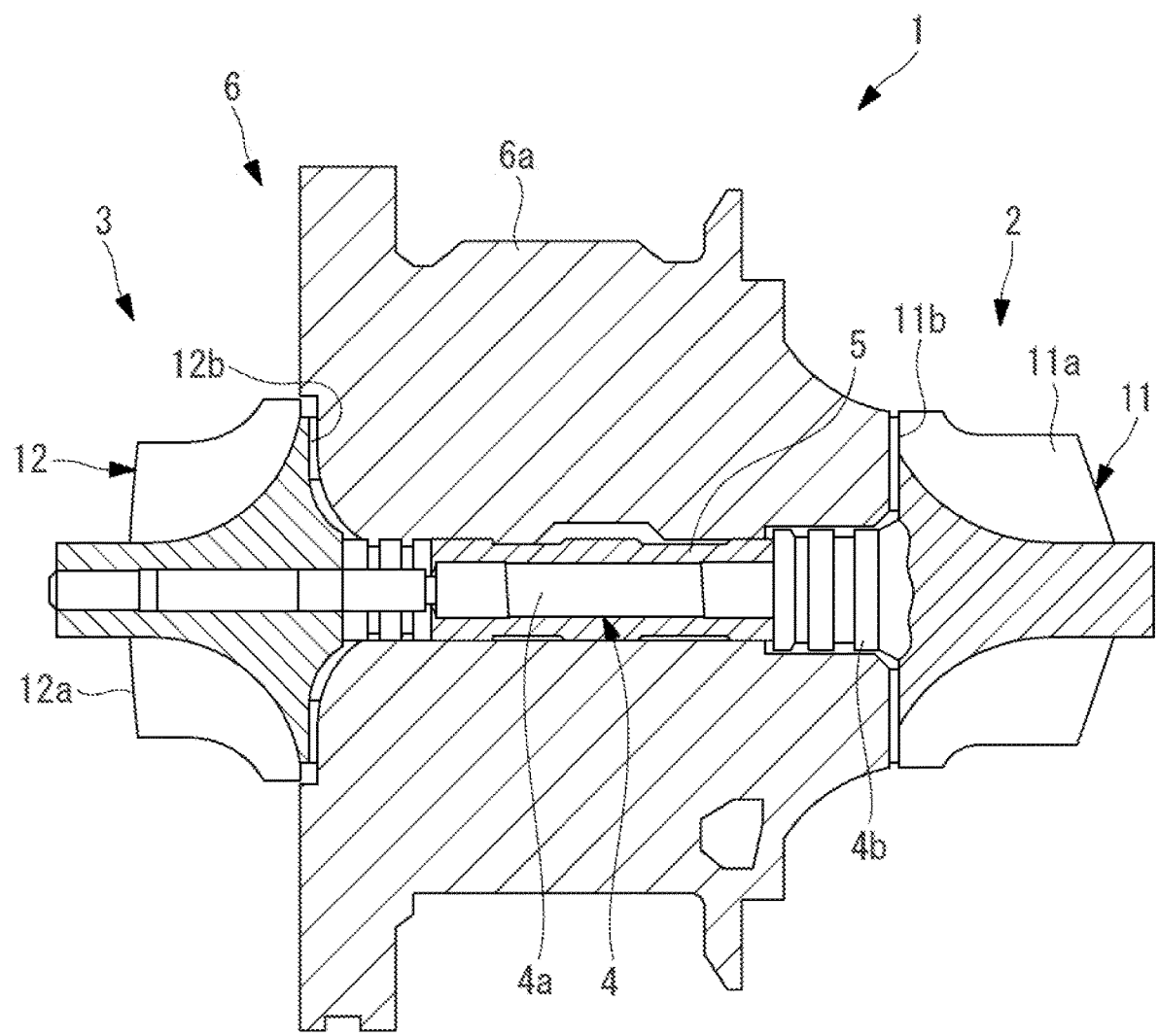
FIG. 1 is a vertical cross-sectional view of a turbocharger according to one embodiment of the present invention.

As shown in FIG. 1, the turbocharger 1 includes an exhaust turbine portion 2 to which fuel gas is supplied, a compressor portion 3 that compresses intake air, a rotor shaft 4 that is rotationally driven by a driving force of the exhaust turbine portion 2, a cylindrical bearing portion 5 that supports the rotor shaft 4 in a rotatable manner, and a housing 6 constituting the outer casing of the turbocharger 1.

The exhaust turbine portion 2 includes a fuel-gas introduction portion (not shown) that draws fuel gas from the diesel engine, a turbine impeller (turbine portion) 11 located on the downstream side of the fuel-gas introduction portion, and a fuel-gas discharge portion (not shown) from which fuel gas is discharged. Fuel gas drawn from the fuel-gas introduction portion causes the turbine impeller 11 to rotate, and is discharged from the fuel-gas discharge portion.

The turbine impeller 11 includes a front surface 11a that receives fuel gas from the fuel-gas introduction portion, and a back surface 11b on opposite side of the front surface 11a. The back surface 11b of the turbine impeller 11 is opposed to a bearing housing 6a to be described later.

The compressor portion 3 includes an air suction portion (not shown) that draws air from outside, a compressor impeller (impeller) 12 that compresses the air introduced from the air suction portion, and an air supply portion (not shown) that is located on the downstream side of the compressor impeller 12 to supply the air compressed by the compressor impeller 12 to the diesel engine.

The compressor impeller 12 includes a front surface 12a that receives air from the air suction portion, and a back surface 12b on opposite side of the front surface 12a. The back surface 12b of the compressor impeller 12 is opposed to the bearing housing 6a to be described later.

The rotor shaft 4 has a round shape in cross section. The compressor impeller 12 is fixed to one end of the rotor shaft 4 (the left end in FIG. 1), while the turbine impeller 11 is fixed to the other end (the right end in FIG. 1). Fuel gas causes the turbine impeller 11 to rotate, which drives the rotor shaft 4 so as to rotate about the central axis in the axial direction. The rotor shaft 4 includes a body portion 4a located inside the bearing portion 5, and an oil sealing portion 4b provided at the axial end of the body portion 4a. The oil sealing portion 4b and the body portion 4a are provided coaxially. The oil sealing portion 4b is formed such that its cross-sectional diameter is larger than the cross-sectional diameter of the body portion 4a. That is, the oil sealing portion 4b is formed wider than the body portion 4a. The oil sealing portion 4b prevents lubricant supplied between the rotor shaft 4 and the bearing portion 5 from flowing into the exhaust turbine portion 2.

Figure 2:
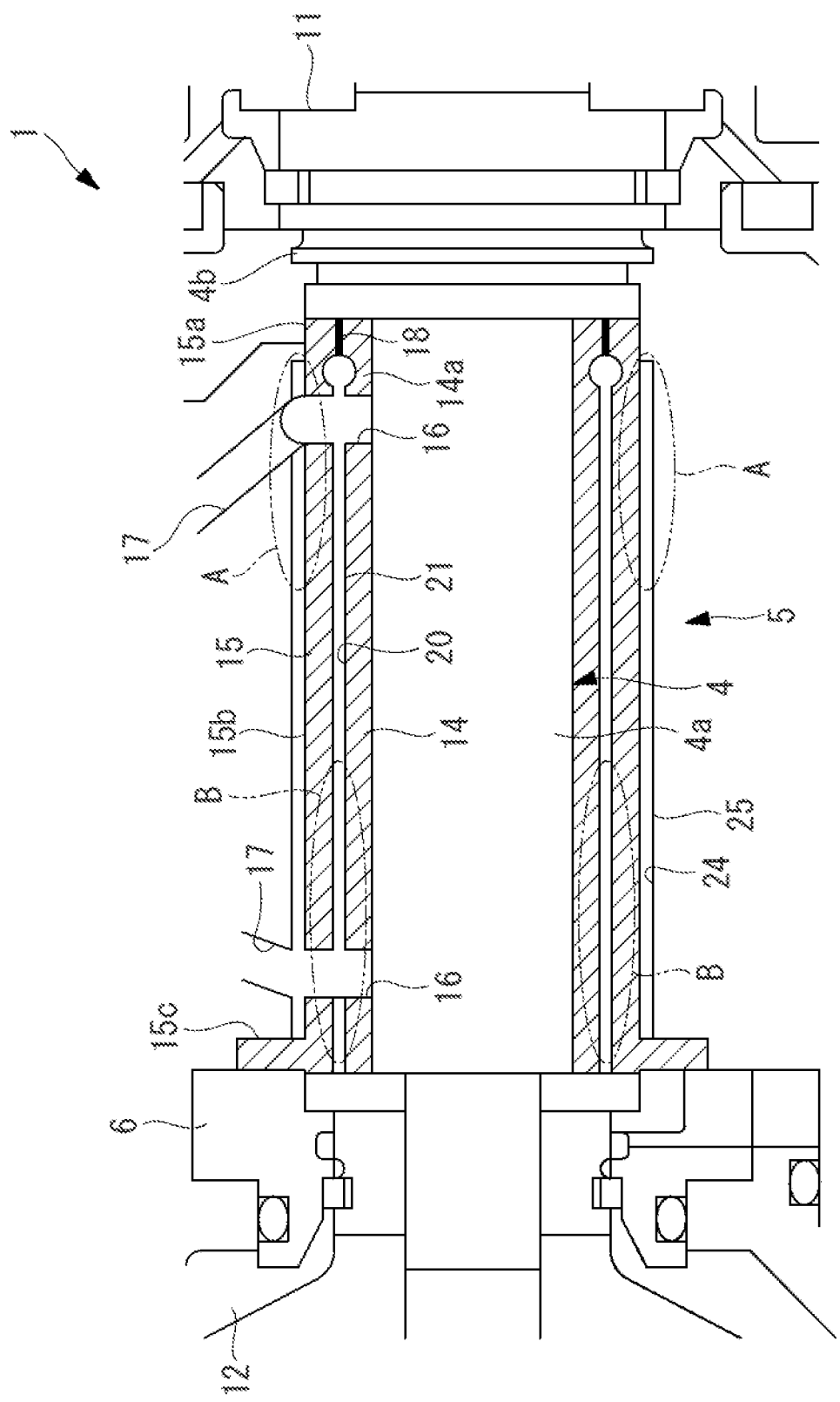
FIG. 2 is a vertical cross-sectional view schematically showing enlarged relevant parts of the turbocharger in FIG. 1.

The bearing portion 5 is a cylindrical member into which the body portion 4a of the rotor shaft 4 is inserted. The bearing portion 5 is provided coaxially with the rotor shaft 4. As shown in FIG. 2, the rotor shaft 4 includes an inner cylinder (inner cylinder portion) 14 having the body portion 4a of the rotor shaft 4 located therein, and an outer cylinder (outer cylinder portion) 15 covering the inner cylinder 14 from the radially outer side. The bearing portion 5 is formed with two oil filling holes 16 passing through the inner cylinder 14 and the outer cylinder 15 in the radial direction. Lubricant is supplied to the oil filling hole 16 through a lubricant supply flow path 17 from a lubricant supply device (not shown) provided in the housing 6.

Lubricant having flowed through the oil filling hole 16 is supplied between the bearing portion 5 and the rotor shaft 4. The bearing portion 5 supports the rotor shaft 4 through the lubricant, and thus supports the rotor shaft 4 in a rotatable manner. The bearing portion 5 has an axial length approximately equal to the axial length of the body portion 4a of the rotor shaft 4.

Figure 3:
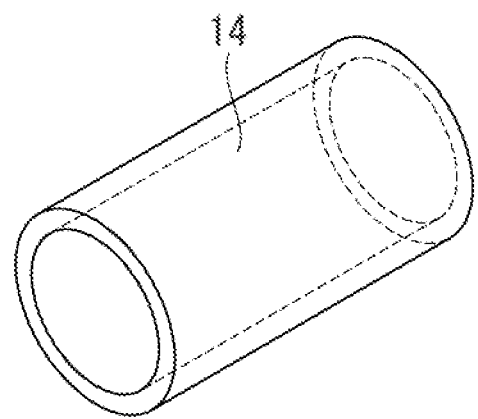
FIG. 3 is a perspective view of an inner cylinder in FIG. 2.

The inner cylinder 14 is made of metal, and is formed into a cylindrical shape as shown in FIG. 3. The inner cylinder 14 is formed with an inner diameter slightly larger than the cross-sectional diameter of the body portion 4a of the rotor shaft 4. The inner cylinder 14 is formed with an outer diameter smaller than the inner diameter of the outer cylinder 15. On the outer peripheral surface of the inner cylinder 14, an inner-cylinder protruding portion 14a is provided in the end-portion region closer to the turbine impeller 11. The inner-cylinder protruding portion 14a protrudes radially outward relative to the other region. Note that FIG. 3 omits illustrations of the inner-cylinder protruding portion for the sake of convenience.

Figure 4:
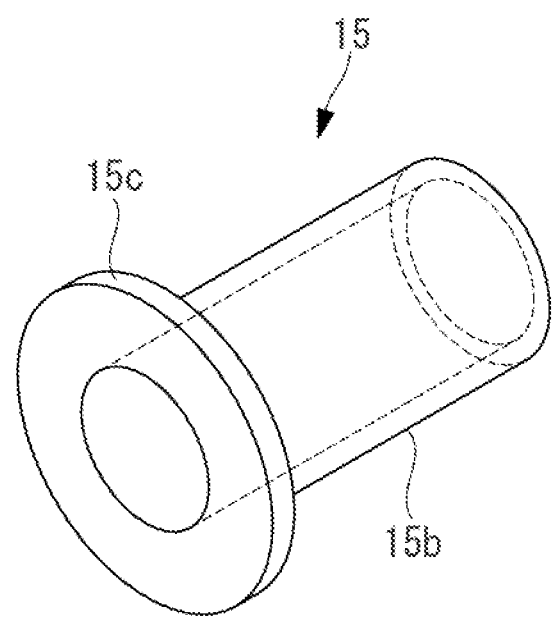
FIG. 4 is a perspective view of an outer cylinder in FIG. 2.

The outer cylinder 15 is made of metal. As shown in FIG. 4, the outer cylinder 15 integrally includes a cylinder portion 15b having a cylindrical shape and covering the inner cylinder 14 from the radially outer side, and a flange portion (fixing portion) 15c protruding radially outward from the outer peripheral surface of the cylinder portion 15b at the end portion closer to the compressor impeller 12. The cylinder portion 15b is formed with an inner diameter larger than the outer diameter of the inner cylinder 14. On the inner peripheral surface of the outer cylinder 15, an outer-cylinder protruding portion 15a is provided in the end-portion region closer to the turbine impeller 11. The outer-cylinder protruding portion 15a protrudes radially inward relative to the other region. Note that FIG. 4 omits illustrations of the outer-cylinder protruding portion for the sake of convenience.

The flange portion 15c is an annular member provided around almost the entire circumferential region on the outer peripheral surface of the cylinder portion 15b. The flange portion 15c is fixed to the housing 6. The flange portion 15c is fixed to the housing 6 in such a manner as to restrict movement of the flange portion 15c in the radial direction and in the axial direction. The method for fixing the flange portion 15c to the housing 6 is not particularly limited. The flange portion 15c may be fixed to the housing 6 by a bolt screwed into the housing 6 through the flange portion 15c. One surface of the flange portion 15c may also be welded or brazed to the housing 6. The housing 6 may also be formed with a recessed portion into which the flange portion 15c is fitted. The flange portion 15c may be fixed to the housing 6 by fitting the flange portion 15c into the recessed portion.

As shown in FIG. 2, the inner cylinder 14 and the outer cylinder 15 are connected by being fixed at a contact portion 18 where the inner-cylinder protruding portion 14a and the outer-cylinder protruding portion 15a come into contact with each other. The method for fixing the inner-cylinder protruding portion 14a and the outer-cylinder protruding portion 15a is not particularly limited. The inner-cylinder protruding portion 14a and the outer-cylinder protruding portion 15a may be fixed by a bolt or screw passing through the inner cylinder 14 and the outer cylinder 15. The inner-cylinder protruding portion 14a and the outer-cylinder protruding portion 15a may also be welded or brazed together. The inner-cylinder protruding portion 14a and the outer-cylinder protruding portion 15a may be provided with respective fitting portions that are fitted to each other, and may be fixed by fitting their respective fitting portions to each other by shrink fit or cooling fit.

The inner cylinder 14 and the outer cylinder 15 are spaced by a predetermined distance in the region other than the inner-cylinder protruding portion 14a and the outer-cylinder protruding portion 15a that are fixed together. A gap is formed between the inner peripheral surface of the inner cylinder 14 and the outer peripheral surface of the outer cylinder 15 (hereinafter, the gap formed between the inner peripheral surface of the inner cylinder 14 and the outer peripheral surface of the outer cylinder 15 is referred to as a "first gap 20"). The first gap 20 is formed over the entire circumferential region of the inner cylinder 14 and the outer cylinder 15.

The first gap 20 communicates with the oil filling hole 16, and is filled with lubricant (first damping member) supplied through the oil filling hole 16. The first gap 20 filled with the lubricant functions as a damping portion (hereinafter, referred to as a "first damping portion 21") that damps vibrations of the bearing portion 5 in the radial direction. The first gap 20 is formed into a round shape in cross section taken along the axial direction at the end portion closer to the turbine impeller 11. That is, the first gap 20 is formed into an annular shape at the end portion closer to the turbine impeller 11.

As described above, the bearing portion 5 has a double-pipe structure made up of the inner cylinder 14 and the outer cylinder 15, which is a so-called folded spring structure. The bearing portion 5 supports a load of the rotor shaft 4 in the axial direction by the flange portion 15c, while supporting the rotor shaft 4 in a rotatable manner by using lubricant interposed between the bearing portion 5 and the rotor shaft 4. That is, the bearing portion 5 is a so-called semi-floating integral journal-thrust bearing.

The housing 6 includes a turbine housing (not shown) accommodating therein the turbine impeller 11, the bearing housing 6a accommodating therein the bearing portion 5, and an impeller housing (not shown) accommodating therein the compressor impeller 12. A gap is formed between the bearing housing 6a and almost the entire region on the outer peripheral surface of the outer cylinder 15 (hereinafter, the gap formed between the bearing housing 6a and the outer peripheral surface of the outer cylinder 15 is referred to as a "second gap 24"). The second gap 24 is filled with lubricant (second damping member) supplied through the oil filling hole 16. The second gap 24 filled with the lubricant functions as a damping portion (hereinafter, referred to as a "second damping portion 25") that damps vibrations of the bearing portion 5 in the radial direction.

The oil filling hole 16 formed on the bearing portion 5 passes through the inner cylinder 14 and the outer cylinder 15 in the radial direction. The oil filling hole 16 is formed at two locations. The two oil filling holes 16 are provided in such a manner as to be spaced by a predetermined distance in the axial direction. One of the oil filling holes 16 is formed closer to the compressor impeller 12, while the other oil filling hole 16 is formed closer to the turbine impeller 11. Each of the oil filling holes 16 communicates with the first gap 20 and the second gap 24 to supply lubricant to the first gap 20 and the second gap 24, and to supply lubricant between the bearing portion 5 and the rotor shaft 4.

The present invention achieves the following operations and effects.

As the rotor shaft 4 moves, the compressor impeller 12 attached to the rotor shaft 4 also moves in the axial direction. When the compressor impeller 12 moves toward the bearing housing 6a, there is a possibility that the back surface 12b of the compressor impeller 12 may interfere with the bearing housing 6a, and thus the compressor impeller 12 and the bearing housing 6a may be damaged. When a gap is provided between the compressor impeller 12 and the bearing housing 6a in order to prevent the compressor impeller 12 from interfering with the bearing housing 6a, gas compressed by the compressor impeller 12 may leak from this gap. This may cause performance degradation in the turbocharger 1. In the present embodiment, the flange portion 15c provided in the bearing portion 5 is fixed to the housing 6 to restrict movement of the bearing portion 5 in the axial direction. This can prevent the rotor shaft 4 from moving in the axial direction due to the movement of the bearing portion 5 in the axial direction. Therefore, the compressor impeller 12 and the bearing housing 6a can be prevented from being damaged by interference of the compressor impeller 12 with the bearing housing 6a. Also, performance degradation in the turbocharger 1 can be minimized.

In some cases, vibrations in the radial direction are input to the rotor shaft 4 due to rotational driving of the turbine impeller 11 or the compressor impeller 12, or other reasons. When vibrations in the radial direction are input to the rotor shaft 4, then these vibrations are input from the rotor shaft 4 to the bearing portion 5. In the present embodiment, the bearing portion 5 is fixed to the housing 6 by the flange portion 15c provided at a first end portion of the outer cylinder 15 (the end portion closer to the compressor impeller 12 in the present embodiment). That is, the bearing portion 5 is fixed to the housing 6 in a cantilevered manner. With this structure, when vibrations in the radial direction are input to the bearing portion 5, the bearing portion 5 vibrates with the first end portion serving as a fixed end, and the second end portion serving as a free end (the end portion closer to the turbine impeller 11 in the present embodiment) on opposite side of the first end portion. When the second end portion vibrates as a free end, the second damping portion 25 acts on the vibrations and damps these vibrations. Particularly, the vibrations are damped in a region A (see FIG. 2) of the second damping portion 25 closer to the second end portion. In this manner, the vibrations closer to the second end portion of the bearing portion 5 can be damped.

In contrast, the inner cylinder 14 of the bearing portion 5 is fixed to the outer cylinder 15 at the second end portion (the end portion closer to the turbine impeller 11 in the present embodiment). The inner cylinder 14 at the first end portion (the end portion closer to the compressor impeller 12 in the present embodiment) is not fixed to a first end portion of the outer cylinder 15, while a gap is formed between the first end portion of the inner cylinder 14 and the first end portion of the outer cylinder 15. The inner cylinder 14 at the first end portion is thus capable of moving relative to the first end portion of the outer cylinder 15. With this structure, when vibrations in the radial direction are input to the bearing portion 5, the inner cylinder 14 vibrates at the first end portion as a free end. When the first end portion of the inner cylinder 14 vibrates as a free end, the first damping portion 21 provided between the inner cylinder 14 and the outer cylinder 15 acts on the vibrations and damps these vibrations. Particularly, the vibrations are damped in a region B (see FIG. 2) of the first damping portion 21 closer to the first end portion. In this manner, the vibrations closer to the first end portion of the bearing portion 5 can be damped.

Therefore, in the present embodiment, even when vibrations in the radial direction are input to the rotor shaft 4, the vibrations can still be damped in the entire region in the axial direction. The vibrations are properly damped, and accordingly vibrations in the turbocharger 1 in its entirety can be reduced.

In the present embodiment, the bearing portion 5 vibrates with its one-side end portion serving as a fixed end, and the other-side end portion serving as a free end. This can increase the amplitude of vibrations at the free end. Therefore, the vibrations can be more properly damped by the first damping portion 21 and the second damping portion 25 compared to the configuration, for example, in which the bearing portion 5 is fixed at the axially central portion.

In the present embodiment, the inner cylinder 14 and the outer cylinder 15 are formed from separate members. In this way, the bearing portion 5 can be formed by molding the cylindrical inner cylinder 14 and the cylindrical outer cylinder 15 of a relatively simple structure, and then fixing the second end portion of the molded inner cylinder 14 to the second end portion of the molded outer cylinder 15. Therefore, the bearing portion 5 can be easily formed.

In the present embodiment, the first gap 20 is formed into an annular shape at the end portion closer to the turbine impeller 11. This can minimize stress concentration, and can properly vibrate the free end portion of the inner cylinder 14.

The present invention is not limited to the inventions according to the above embodiment, and changes and modifications may be optionally made without departing from the scope of the present invention.

For example, in the above embodiment, the example has been described in which the inner cylinder 14 and the outer cylinder 15 are formed from separate members. However, the inner cylinder 14 and the outer cylinder 15 may be formed from a single member. The number of components can be reduced by forming the inner cylinder 14 and the outer cylinder 15 from a single member as described above.

REFERENCE SINGS LIST

1: Turbocharger
4: Rotor shaft
5: Bearing portion
6: Housing
11: Turbine impeller (Turbine portion)
12: Compressor impeller (Impeller)
14: Inner cylinder (Inner cylinder portion)
14a: Inner-cylinder protruding portion
15: Outer cylinder (Outer cylinder portion)
15a: Outer-cylinder protruding portion
15c: Flange portion
16: Oil filling hole
17: Lubricant supply flow path 20: First gap
21: First damping portion
24: Second gap
25: Second damping portion

The invention claimed is:
1. A turbocharger comprising:
a rotor shaft that is rotationally driven by a driving force of a turbine portion supplied with fuel gas discharged from an internal combustion engine;
an impeller that is attached to the rotor shaft and compresses air;
a cylindrical bearing portion that includes a cylindrical inner cylinder portion having the rotor shaft located therein, and a cylindrical outer cylinder portion covering the inner cylinder portion from a radially outer side, and that supports the rotor shaft in a rotatable manner; and
a housing that accommodates therein the impeller and the bearing portion, wherein
a gap is formed between an axial first end portion of the inner cylinder portion and an axial first end portion of the outer cylinder portion, and an axial second end portion of the inner cylinder portion is connected with an axial second end portion of the outer cylinder portion,
a first damping member is provided in the gap,
a second damping member is provided between the housing and the second end portion of the outer cylinder portion, and
the housing and the bearing portion are fixed by a fixing portion provided at the first end portion of the outer cylinder portion in such a manner as to restrict movement of the fixing portion in a radial direction and in an axial direction.

2. The turbocharger according to claim 1, wherein the inner cylinder portion and the outer cylinder portion are formed from separate members.

3. The turbocharger according to claim 1, wherein the inner cylinder portion and the outer cylinder portion are formed from a single member.

* * * * *